United States Patent [19]

Washall

[11] 4,041,139
[45] Aug. 9, 1977

[54] RECOVERY OF SELENIUM FROM URETHANE SOLUTIONS

[75] Inventor: Thomas A. Washall, Wilmington, Del.

[73] Assignee: Atlantic Richfield Company, Los Angeles, Calif.

[21] Appl. No.: 718,635

[22] Filed: Aug. 30, 1976

[51] Int. Cl.² ............................................. C01B 19/00
[52] U.S. Cl. .................................. 423/508; 423/509; 423/510
[58] Field of Search ....................... 423/508, 509, 510

[56] References Cited

U.S. PATENT DOCUMENTS

| | | | |
|---|---|---|---|
| 1,915,703 | 6/1933 | Towne et al. | 423/510 |
| 2,406,666 | 8/1946 | Clark et al. | 423/509 |
| 3,437,453 | 4/1969 | Serpinet | 423/509 |
| 3,743,481 | 7/1973 | Nakano | 423/509 X |
| 3,848,069 | 11/1974 | Carey et al. | 423/508 |
| 3,895,054 | 7/1975 | Zajacek et al. | 260/482 C X |

*Primary Examiner*—Edward Stern
*Attorney, Agent, or Firm*—Delbert E. McCaslin

[57] ABSTRACT

A process for the recovery of selenium by liquid-liquid extraction from a urethane solution containing selenium compounds by contacting the selenium-containing urethane solution at a suitable temperature with water and a saturated aliphatic or alicyclic paraffin hydrocarbon or mixtures thereof. The selenium may be recovered from the resulting hydrocarbon phase in the form of selenium per se or selenium dioxide for reuse in the preparation of urethanes.

14 Claims, No Drawings

4,041,139

RECOVERY OF SELENIUM FROM URETHANE SOLUTIONS

BACKGROUND OF THE INVENTION

In U.S. Pat. No. 3,895,054 there is disclosed a process for the manufacture of urethanes (carbamic acid esters) by reacting an organic compound containing at least one hydroxyl group, e.g. ethyl alcohol, with carbon monoxide and a nitrogenous organic compound at elevated temperature and pressure in the presence of a selenium catalyst and a base and/or water.

The present invention is directed to a simple and effective method of recovering the selenium from urethane solutions produced, for example, by the above described process and containing selenium which may be in the form of selenium per se, inorganic selenium compounds and organoselenium compounds. Because of the high reactivity of selenium, when used as a catalyst as in the above reaction its combination with organic compounds very frequently results in the formation of organoselenium compounds, such as diethyl diselenide, which remain in solution with the urethane reaction product. In such reaction, a portion of the selenium catalyst such as the selenium per se or selenium dioxide, selenium disulfide, selenium oxychloride, etc. is converted to one or more organoselenium compounds which may be classified generally as selenols, selenides, benzoselenazoles, esters of selenocarbonic acid, selenic acid and selenious acid, selenones and the like. The type and number of organoselenium compounds which may be formed is a function of the reaction conditions used to produce the urethanes such as time, temperature, pressure and solvent. In addition, the inorganic selenium compounds used as catalysts or formed in the reaction may also remain in solution with the urethane product.

Because of the cost and toxicity of selenium, it is essential that as much of the selenium be recovered from the urethane reaction product as is possible and from the inorganic or organoselenium compounds in a form suitable for reuse as a catalyst.

Prior art processes have been proposed for the recovery of selenium from certain organic reaction products and aqueous or acidic solutions. However, such prior art processes are generally narrow in scope and application and have proven to be of little or no value to the recovery of selenium from urethane solutions containing same.

U.S. Pat. No. 3,387,928, for example, proposes dissolving a selenium-containing material (ore concentrates and solutions) in a particular aqueous acid and admixing the aqueous acidic solution with a 2-hydroxyethyl-n-alkyl ether and allowing the resulting solution to stand to effect a separation of the selenium values into an organic phase.

U.S. Pat. No. 3,577,216 discloses a process for the recovery of selenium IV used as a catalyst in the oxidative production of carboxylic acids. The selective extraction of selenious acid in the presence of an aqueous solution of inorganic salts is disclosed wherein the selenious acid may be separated by liquid-liquid extraction in counterflow with a solvent and chemical treatment. No details of the extraction or solvent are set forth.

SUMMARY OF THE INVENTION

This invention relates to a process for the recovery of selenium from organic solutions containing selenium or compounds thereof. More specifically, the present invention concerns a process for the liquid-liquid extraction of selenium compounds from an effluent solution obtained from the selenium catalyzed conversion of an organic nitrocompound to produce a urethane as described for example in the aforementioned U.S. Pat. No. 3,895,054 and incorporated herein by reference. The urethane products produced by such process, which may contain one or more organoselenium compounds as well as metallic selenium and/or inorganic selenium compounds, is contacted with a saturated aliphatic or alicyclic paraffin hydrocarbon, such as n-pentane, isooctane, cyclohexane, etc., preferably in countercurrent flow, without affecting the urethane product and minimizing solubility and loss of urethane while substantially removing the selenium compounds. By such process of the invention substantial amounts of the selenium compounds are extracted into a hydrocarbon phase while the essentially deselenized urethane remains in a water-alcohol phase. The selenium enriched hydrocarbon phase may be separated from the water-alcohol phase by any appropriate liquid phase separation method, such as decantation, and the hydrocarbon recovered by distillation or evaporation leaving a selenium compound concentrate which may be treated to recover the selenium in a form suitable for reuse in the urethane synthesis reaction.

Advantages provided by the process of the present invention, as compared to known selenium removal processes, are (1) the relative simplicity of adding water to a total urethane reaction product, already having an alcohol contained therein, followed by a liquid-liquid extraction with a saturated paraffin hydrocarbon at low temperatures and (2) due to the high selectivity of the particular aliphatic and alicyclic hydrocarbons employed, substantially no loss of the urethane being treated for selenium removal. Aromatic hydrocarbons, such as benzene and xylene and the like result in a substantial loss of the urethane into the hydrocarbon phase and therefore cannot be employed in the present selenium recovery process.

It is an object of this invention therefore to provide a process for the substantial recovery of valuable selenium from selenium-containing urethane solutions and the ultimate purification of the urethane.

It is another object of this invention to provide a process for the recovery of selenium in a form suitable for recycle and reuse as a catalyst for the synthesis of urethanes from an organic compound containing at least one hydroxyl group with carbon monoxide and a nitrogenous organic compound.

It is a further object of this invention to recover contained selenium values from urethane solutions utilizing water and an aliphatic or alicyclic paraffin hydrocarbon to extract the selenium and to recover the hydrocarbon and the selenium from the hydrocarbon phase in a form suitable for recycle and reuse in the selenium recovery process and urethane synthesis respectively.

These and other objects and advantages of this invention will become apparent from the description of the invention which follows and from the claims.

DESCRIPTION OF THE INVENTION

In accordance with the present invention, a urethane solution containing selenium or compounds thereof, as for example, a urethane solution obtained by reacting an organic compound containing at least one hydroxyl group with carbon monoxide and an organic nitrogenous compound containing at least one non-cyclic group, in which a nitrogen atom is directly attached to a single carbon atom and is also attached through a double bond to an oxygen or nitrogen atom, at elevated temperatures and pressures in the presence of a metallic selenium or selenium compound catalyst and a base and/or water, is subjected to a liquid-liquid extraction with an aliphatic or alicyclic paraffinic hydrocarbon, or mixtures thereof, at low temperatures, preferably ambient temperatures to extract and remove selenium compounds from the solution to provide an essentially deselenized urethane solution and to recover the valuable selenium.

The amount and type of selenium compounds in the crude urethane reaction product will generally depend on the, type and amount of selenium compound, including selenium per se, employed to produce the urethane as well as the reaction conditions and urethane being produced. Thus, the amount of selenium in the form of selenium per se, inorganic selenium compounds or organoselenium compounds, can range from $\frac{1}{2}$ to 5 percent but will generally be from 1 to 3 percent by weight of the urethane solution produced, for example, by the process as set forth in U.S. Pat. No. 3,895,054.

The saturated aliphatic and alicyclic paraffin hydrocarbons which may be employed may be any saturated normal, iso- or cycloparaffin containing from 5 to 16 carbon atoms either alone or mixtures thereof. Preferred are the aliphatic paraffin hydrocarbons or a mixture including the cycloparaffins in the 5 to 8 carbon atom range which hydrocarbons are more easily recovered leaving the selenium concentrate. Petroleum fractions containing mixtures of normal, iso- and cycloparaffins may be used. Representative saturated aliphatic and alicyclic paraffin hydrocarbons suitable for use in the invention include, for example, n-pentane, isopentane, n-hexane, 2-methylpentane, 3-methylpentane, 2,3-dimethylbutane, n-heptane, 2-methylhexane, 3-ethylpentane, 2,3-dimethylpentane, 2,4-dimethylpentane, n-octane, 2-methylheptane, 2,2-dimethylhexane, 2,3-dimethylhexane, 3,4-dimethylhexane, 2,2,4-trimethylpentane, 2,3,4-trimethylpentane, n-nonane, n-decane, n-undecane, n-hexadecane, cyclopentane, cyclohexane, methylcyclopentane, methylcyclohexane, ethylcyclopentane, 1,2-dimethylcyclopentane, cyclooctane, ethylcyclohexane, 1,3-dimethylcyclohexane, 1-isopropyl-4-methylcyclohexane, etc. While, as indicated, mixtures of the hydrocarbons may be employed, it is preferable to use individual hydrocarbons in order to lessen any recovery problem.

Water is added to the crude urethane reaction product (which contains, in addition to the urethane product (carbamate), some related by products, alcohol, a base such as potassium acetate or an amine, various selenium compounds and selenium per se), to produce two phases when contacted with the saturated hydrocarbon. Generally the ratio of reaction product to water employed in the process is 5:1. Higher or lower ratios may be used. However, as the ratio of product to water is increased, the solubility of the saturated hydrocarbon in the reaction product increases resulting ultimately in a single phase. Lower ratios of product/water may be used to the point where the solubility of the urethane is lowered to the extent that precipitation occurs. In carrying out the process, the optimum product to water ratio is such that the solubility of the saturated hydrocarbon in the urethane product phase and the solubility of the alcohol (contained in the urethane product) in the saturated hydrocarbon phase are at a minimum.

Generally 20 percent and up to 100 percent by volume of the saturated paraffin hydrocarbon based on the volume of crude urethane solution is added to the urethane solution to carry out the liquid-liquid extraction of the selenium compounds from the urethane solutions. Lesser amounts of hydrocarbon may be employed so long as a two phase system is produced on contact with the water/crude urethane solution. Larger amounts of saturated hydrocarbon may be employed, for example greater than 100 percent by volume based on the volume of urethane solution employed but is avoided since there is no apparent improvement in results, and accordingly, the addition of excess hydrocarbon would only necessitate the burdensome recovery of a large volume of hydrocarbon during final distillation or evaporation to recover hydrocarbon and selenium concentrate.

The selenium compound concentrate containing various selenium compounds, after recovery of the hydrocarbon, may be treated in a number of ways to recover the selenium in catalytically useful form. One method is to heat the concentrate to between 250° to 750° C. in an inert gas stream and collect the volatilized selenium per se. Another suitable method for recovery of the selenium is to convert the selenium, in the presence of air or oxygen, to selenium dioxide at temperatures of from 300° to 800° C., preferably 400° to 650° C., and recover the SeO$_2$ from the effluent reactor stream by cooling to below the sublimation point of SeO$_2$ (approx. 300° C.) to collect the SeO$_2$.

Selenium per se, which may also be present in the crude urethane reaction product, may be readily recovered preferably by bubbling air through the crude urethane solution to precipitate and essentially remove by filtration the contained selenium. The selenium per se may also be precipitated from the extracted solution.

The process of the present invention is generally carried out at ambient temperatures although slightly lower or higher temperatures can be tolerated. While the solubility relationships of the urethane, water/alcohol and saturated hydrocarbon may change somewhat at various temperatures, the selectivity of the saturated hydrocarbon for the relatively non-polar selenium compounds is not believed to change significantly.

Although the process of the present invention will be directed to the treatment and recovery of selenium compounds from a crude urethane which is a diethyltoluene-2,4-dicarbamate solution containing selenium compounds and produced by the process of U.S. Pat. No. 3,895,054, it is not intended that the process be limited to such carbamate solution and those skilled in the art will recognize that the present process is broadly applicable to the treatment of other urethanes such as methyl N-phenyl carbamate, diethyltoluene-2,6-dicarbamate, dibutyl toluene-2,4-dicarbamate, etc. which have been prepared, for example, by the selenium catalyzed process as described in U.S. Pat. No. 3,895,054.

The following Examples are provided to illustrate the recovery of selenium compounds from a urethane solution in accordance with the principles of this invention but are not to be construed as limiting the invention in anyway except as indicated by the claims.

In the Examples which follow the urethane solutions were obtained by taking the effluent from a selenium catalyzed conversion of 2,4-dinitrotoluene to the corresponding diurethane as described in U.S. Pat. No.

3,895,054. The solution contained a mixture of selenium per se and various unidentified selenium compounds. The urethane solution of Examples I–III contained approximately 87 percent ethyl alcohol, 10 percent diethyltoluene-2,4-dicarbamate and related by products such as monourethanes, 2.0 percent potassium acetate base, and about 1.0 to 2.0 percent selenium as unreacted selenium, unidentified inorganic selenium and organoselenium compounds. The urethane solution of Example IV and V contained approximately 17 percent ethanol, 50 percent diethyltoluene-2,4-dicarbamate and related by products, 30 percent triethylamine/pyridine mixture and 3 percent selenium as unreacted selenium, unidentified inorganic selenium and organoselenium compounds. After separation of the hydrocarbon phase, the alcohol/water phase containing the urethane was analyzed by x-ray to determine selenium removal.

EXAMPLE I 25 mls. of selenium-containing diethyltoluene-2,4-dicarbamate were mixed with 25 mls. of methanol (to further increase the solubility of the dicarbamate and decrease the solubility of the n-pentane in the alcohol/water phase) and 10 mls. of water. The resulting mixture was contacted successively 5 times with 25 ml. portions of n-pentane at ambient temperature and the hydrocarbon (N-pentane) resulting phases separated by decantation. Analysis of the alcohol/water phase containing the carbamate showed that 90.6 percent of the selenium had been removed. The results were as follows:

| | Wt. (gms) | % Se | Se (gms) | % of Total Se |
|---|---|---|---|---|
| Crude Urethane Alcohol/H$_2$O | 50.5 | 0.17 | 0.0859 | — |
| (Bottom) Phase | 40.3 | 0.02 | 0.0081 | 9.4 |

EXAMPLE II 50 ml. of the selenium-containing diethyltoluene-2,4-dicarbamate were mixed with 10 ml. of water and the resulting mixture contacted successively 5 times with 50 ml. portions of n-pentane at ambient temperature. The resulting hydrocarbon and alcohol/water phases were separated by decantation. Analysis of the alcohol/water phase showed that 81.3 percent selenium was removed from the urethane solution. The results were as follows:

| | Wt. (gms) | % Se | Se (gms) | % of Total Se |
|---|---|---|---|---|
| Crude Urethane Alcohol/H$_2$O | 73.3 | 0.28 | 0.2052 | — |
| (Bottom) Phase | 68.3 | 0.052 | 0.0384 | 18.7 |

EXAMPLE III

The procedure of Example II was repeated using 50 ml. portions of isooctane to successively contact the crude urethane/water mixture. Analysis of the resulting alcohol/water phase showed that 82.7 percent of the selenium was removed from the urethane solution. The results were as follows:

| | Wt. (gms) | % Se | Se (gms) | % of Total Se |
|---|---|---|---|---|
| Crude Urethane Alcohol/H$_2$O | 73.3 | 0.28 | 0.2052 | — |
| (Bottom) Phase | 68.3 | 0.052 | 0.0355 | 17.3 |

EXAMPLE IV

A 50 ml. portion of diethyltoluene-2,4-dicarbamate was mixed with 10 mls. of water and the resulting mixture contacted successively 5 times with 50 ml. portions of cyclohexane at ambient temperature. The resulting hydrocarbon phases and alcohol/water phase were separated. Analysis of the alcohol/water phase indicated that 85.1 percent selenium was removed from the urethane solution. The results were as follows:

| | Wt. (gms) | % Se | Se (gms) | % of Total Se |
|---|---|---|---|---|
| Crude Urethane Alcohol/H$_2$O | 78.6 | 0.39 | 0.3102 | — |
| (Bottom) Phase | 70.6 | 0.065 | 0.0462 | 14.9 |

EXAMPLE V

The procedure of Example IV was repeated using 50 ml. portions of ethylcyclohexane to successively contact the urethane/water mixture. Analysis of the resulting alcohol/water phase showed that 84.7 percent of the selenium was removed from the crude urethane solution.

I claim:
1. A process for the recovery of selenium from selenium-containing urethane solutions derived from the selenium catalyzed reaction of an organic compound containing at least one hydroxyl group with carbon monoxide and a nitrogenous organic compound at elevated temperatures and pressures in the presence of a base and/or water, which comprises the steps of:
   adding water to the selenium-containing urethane solution forming a urethane-water-alcohol mixture;
   contacting the urethane-water-alcohol mixture with a saturated aliphatic or alicyclic paraffin hydrocarbon having from 5 to 16 carbon atoms, or mixtures thereof, to extract selenium compounds from said mixture and form a selenium-containing hydrocarbon phase and a urethane-containing alcohol-water phase;
   separating the hydrocarbon phase from the alcohol-water phase;
   separating the hydrocarbon from the hydrocarbon phase leaving a selenium compound concentrate; and
   recovering selenium from said selenium concentrate.
2. A process according to claim 1 wherein the ratio of selenium-containing urethane solution to water employed is from 5:1 to form the urethane-water-alcohol mixture.
3. A process according to claim 1 wherein the saturated aliphatic or alicyclic paraffin hydrocarbon has from 5 to 8 carbon atoms.
4. A process according to claim 3 wherein the hydrocarbon is selected from the group consisting of n-pentane, isooctane, cyclohexane, and ethylcyclohexane.

5. A process according to claim 4 wherein the hydrocarbon is n-pentane or isooctane.

6. A process according to claim 4 wherein the hydrocarbon is cyclohexane or ethylcyclohexane.

7. A process according to claim 1 wherein the urethane-water-alcohol mixture is contacted with at least 20 percent by volume of hydrocarbon based on the selenium-containing urethane solution.

8. A process according to claim 1 wherein ambient temperatures are employed.

9. A process according to claim 1 wherein the hydrocarbon phase is separated from the alcohol-water phase by decantation.

10. A process according to claim 1 wherein the hydrocarbon is distilled from the hydrocarbon phase leaving a selenium compound concentrate.

11. A process according to claim 1 wherein the hydrocarbon is evaporated from the hydrocarbon phase leaving a selenium compound concentrate.

12. A process according to claim 1 wherein the selenium compound concentrate is treated with air or oxygen at a temperature of from about 300° to 800° C. to convert the selenium compounds to selenium dioxide and recovering said selenium dioxide.

13. A process according to claim 12 wherein the temperature is from about 400° to 650° C.

14. A process according to claim 1 wherein the selenium-compound concentrate is heated to between about 250° to 750° C. in an inert gas stream to volatilize selenium and recovering said volatilized selenium.

* * * * *